(12) United States Patent
Seo et al.

(10) Patent No.: US 10,866,616 B2
(45) Date of Patent: Dec. 15, 2020

(54) ELECTRONIC DEVICE INCLUDING COVER GLASS AND METHOD FOR PROCESSING THE COVER GLASS

(71) Applicant: Samsung Electronics Co., Ltd., Gyeonggi-do (KR)

(72) Inventors: Youngmin Seo, Gyeonggi-do (KR); Youngsoo Lee, Gyeonggi-do (KR); Min Kim, Gyeonggi-do (KR); Yongha Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/037,313

(22) Filed: Jul. 17, 2018

(65) Prior Publication Data
US 2019/0025880 A1 Jan. 24, 2019

(30) Foreign Application Priority Data
Jul. 24, 2017 (KR) .......................... 10-2017-0093404

(51) Int. Cl.
G06F 1/16 (2006.01)
H05K 5/00 (2006.01)
H05K 7/00 (2006.01)
G06F 3/041 (2006.01)

(52) U.S. Cl.
CPC .......... *G06F 1/1626* (2013.01); *G06F 1/1605* (2013.01); *G06F 1/1613* (2013.01); *G06F 1/1637* (2013.01); *G06F 1/1643* (2013.01); *G06F 1/1686* (2013.01); *G06F 3/0412* (2013.01)

(58) Field of Classification Search
CPC .... G06F 1/1626; G06F 1/1605; G06F 1/1613; G06F 1/1637; G06F 1/1643; G06F 1/1686; G06F 3/0412
USPC .......................................... 361/679.21–679.3
See application file for complete search history.

(56) References Cited

U.S. PATENT DOCUMENTS

| 2012/0242635 | A1* | 9/2012 | Erhart | G06F 1/1626 |
| | | | | 345/207 |
| 2013/0177302 | A1* | 7/2013 | Weber | G06F 1/1626 |
| | | | | 396/155 |
| 2017/0003716 | A1 | 1/2017 | Chong et al. | |
| 2018/0113241 | A1* | 4/2018 | Powell | G02B 5/045 |
| 2018/0126704 | A1* | 5/2018 | Zhang | C03C 15/00 |

FOREIGN PATENT DOCUMENTS

| KR | 10-2017-0005281 A | 1/2017 |
| KR | 10-2017-0021182 A | 2/2017 |

OTHER PUBLICATIONS

"Huawei Honor Magic", Huawei Technologies Co., Ltd., released Dec. 2016.

* cited by examiner

*Primary Examiner* — Anthony M Haughton
(74) *Attorney, Agent, or Firm* — Cha & Reiter LLC.

(57) ABSTRACT

In an embodiment, a liquid planarization material is coated on at least one of a first surface and a second surface of the cover glass. The second surface faces a direction opposite the first surface. The liquid planarization material is pressed toward the cover glass by a pressing plate and cured. Then, the pressing plate is detached from the cured planarization material and the cover glass. Other embodiments are possible.

9 Claims, 7 Drawing Sheets

ELECTRONIC DEVICE INCLUDING COVER GLASS AND METHOD FOR PROCESSING THE COVER GLASS

CROSS-REFERENCE TO RELATED APPLICATION(S)

This application is based on and claims priority under 35 U.S.C. § 119 to Korean Patent Application No. 10-2017-0093404, filed on Jul. 24, 2017, in the Korean Intellectual Property Office, the disclosure of which is incorporated by reference herein in its entirety.

TECHNICAL FIELD

The present disclosure generally relates to an electronic device that includes a cover glass and to a method for processing the cover glass.

BACKGROUND

Technologies such as electronic devices have been developed to provide a great number of functions to the users at a high level of performance. Thus, today's electronic devices not only provide traditional communication functions such as voice calls and text messaging, but also provide a great variety of functions such as multimedia playback, Internet access, taking memos, etc. In particular, most electronic devices are equipped with cameras to allow for image and video capture. In recent years, based on user demand, the quality of these cameras has dramatically improved so that the quality of the images taken has also improved.

At the same time, in order to improve the external aesthetic appearance of the devices, the electronic devices have been designed to have a curved surface and/or have minimal bezel regions surrounding the display. As a result, the cover glass of the electronic devices has come to have at least partially a curved surface.

In this case, even with a high-quality camera, the resolution of the captured images may be degraded due to defects in the curvature or surface roughness of the cover glass that covers the camera. Such defects may occur in a surface treatment process of the cover glass.

In order to solve the above problem, a hole in the cover glass may be formed by removing a portion of the cover glass corresponding to the camera. This solution is effective in preventing degradation in the resolution of the camera. However, such a hole in the cover glass may deteriorate the waterproof characteristics of the electronic device. Also, having a hole in the cover glass may defeat the purpose of the cover glass to protect the camera from external impact.

SUMMARY

According to an embodiment of the present disclosure, an electronic device may comprise a camera, a cover glass covering the camera and having a first surface facing the camera and a second surface facing a direction opposite the first surface, and a substantially transparent planarization material coated on at least one of the first surface and the second surface of the cover glass.

According to an embodiment of the present disclosure, a method for processing a cover glass of an electronic device may comprise operations of coating a liquid planarization material on at least one of a first surface and a second surface of the cover glass, where the second surface faces a direction opposite the first surface, pressing the liquid planarization material toward the cover glass by using a pressing plate, curing the liquid planarization material, and detaching the pressing plate from the cured planarization material and the cover glass.

According to an embodiment of the present disclosure, by performing local processing using a planarization material on at least a part of the cover glass, it is possible to improve the optical flatness of the cover glass without forming a hole in a portion of the cover glass corresponding to the camera. It is therefore possible to provide an electronic device with a high-performance camera.

BRIEF DESCRIPTION OF THE DRAWINGS

Aspects, features, and advantages of certain embodiments of the present disclosure will be more apparent from the following description taken in conjunction with the accompanying drawings, in which.

DETAILED DESCRIPTION

Figure 1:
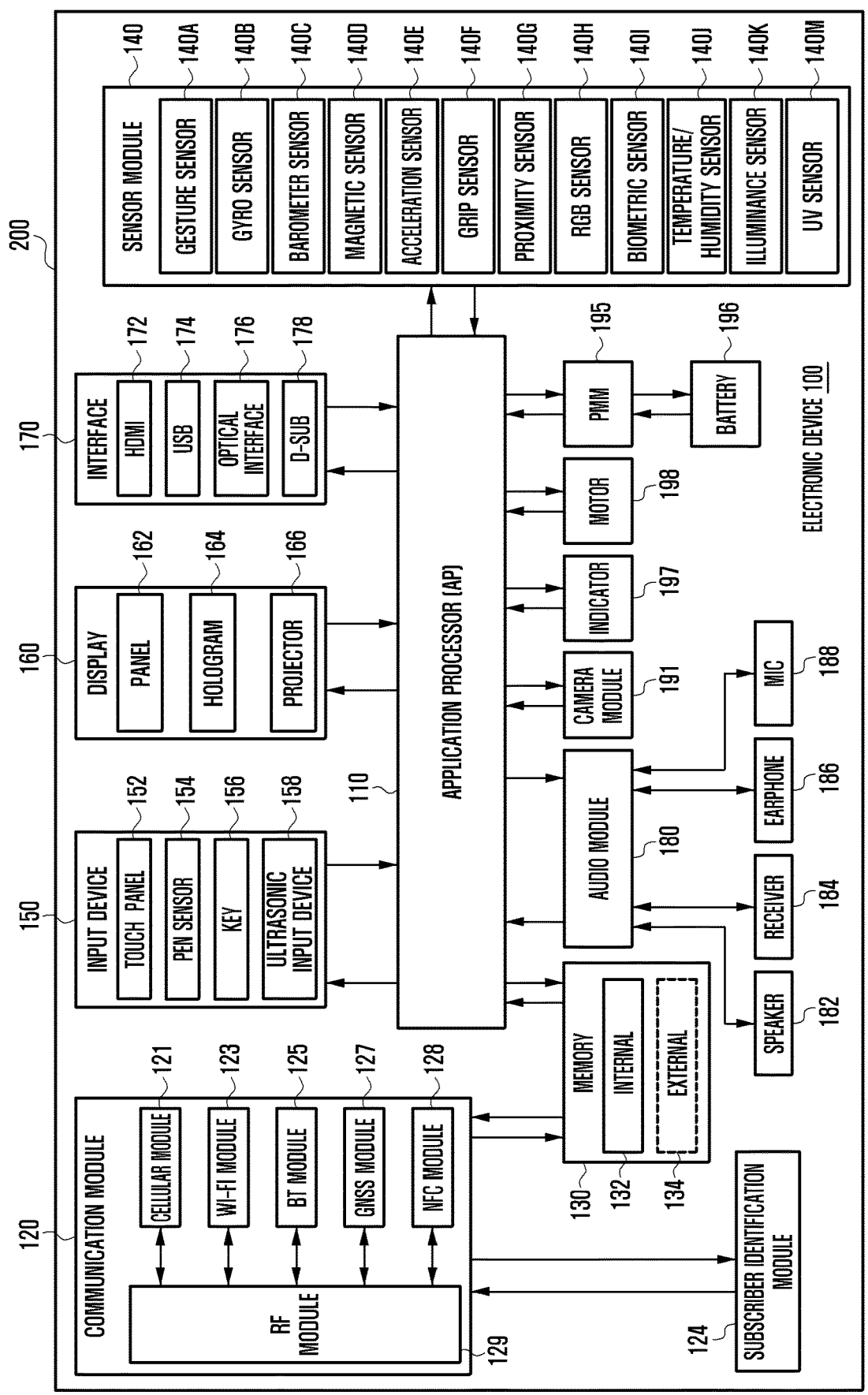
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims may not limited to their dictionary meanings, but are merely used by the inventors to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" may include the plural thereof unless the context clearly indicates otherwise. Thus, for example, reference to "a component surface" includes reference to one or more of such surfaces.

In this disclosure, the expression "A or B" or "at least one of A and/or B" may include A, may include B, or may include both A and B. Expressions including ordinal numbers, such as "first" and "second," etc., may refer to corresponding components without implying an order of importance, and are used merely to distinguish each component from the others without unduly limiting the components. In case where a certain (e.g., the first) element is referred to as being "connected to" or "accessed by" (functionally or communicatively) other (e.g., the second) element, it should be understood that the element is directly connected to or accessed by the other element or through another (e.g., the third) element. In this disclosure, the expression "configured to" may be used, depending on situations, interchangeably with "adapted to," "having the ability to," "made to," "capable of," or "designed to." In some situations, the expression "device configured to" may mean that the device may operate with other device(s) or other component(s). For example, the expression "processor configured to perform A, B and C" may mean a dedicated processor (e.g., an embedded processor) for performing the above operations, or a general-purpose processor (e.g., central processing unit (CPU) or an application processor (AP)) capable of performing the above operations by executing one or more software programs stored in a memory device. An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, and a wearable device. For example, a wearable device may include at least one of an accessory type (e.g., a watch, a ring, a bracelet, an anklet, a necklace, an electronic accessory, eyeglasses, contact lenses, or a head-mounted device (HMD)), a textile or cloth assembled type (e.g., electronic clothing), a body attached type (e.g., a skin pad or tattoo), and a body transplant circuit. In some embodiments, an electronic device may include at least one of a television (TV), a digital versatile disc (DVD) player, an audio device, a refrigerator, an air-conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™ PlayStation™), an electronic dictionary, an electronic key, a camcorder, and an electronic frame.

In various embodiments of the present disclosure, an electronic device may include at least one of various medical devices (e.g., magnetic resonance angiography (MRA) device, magnetic resonance imaging (MRI) device, computed tomography (CT) device, a scanning machine, an ultrasonic wave device, etc.), a navigation device, a global navigation satellite system (GNSS), an event data recorder (EDR), a flight data recorder (FDR), a vehicle infotainment device, an electronic equipment for a ship (e.g., navigation equipment for a ship, gyrocompass, etc.), avionics, a security device, a head unit or device for a vehicle, an industrial or home robot, a drone, an automated teller machine (ATM), a point of sales (POS), and various Internet of things (IoT) devices (e.g., a lamp, various sensors, a sprinkler, a fire alarm, a thermostat, a street light, a toaster, athletic equipment, a hot water tank, a heater, a boiler, etc.). According to a certain embodiment, an electronic device may include at least one of furniture, a portion of a building/structure or car, an electronic board, an electronic signature receiving device, a projector, and various measuring meters (e.g., a water meter, an electric meter, a gas meter, a wave meter, etc.). In various embodiments, an electronic device may be flexible or a combination of two or more of the aforementioned devices. An electronic device according to various embodiments of this disclosure is not limited to the aforementioned devices. In this disclosure, the term a user may refer to a person who uses an electronic device, or a machine (e.g., an artificial intelligence device) which uses an electronic device.

FIG. 1 is a block diagram illustrating an electronic device 100 according to an embodiment of the present disclosure.

Referring to FIG. 1, the electronic device 100 may include at least one processor (e.g., application processor) 110, a communication module 120, a subscriber identification module (SIM) card 124, a memory 130, a sensor module 140, an input unit or input device 150, a display or display module 160, an interface 170, an audio module 180, a camera module 191, a power management module 195, a battery 196, an indicator 197, and a motor 198. The processor 110 is capable of executing, for example, an operating system or an application program to control a plurality of hardware or software components connected to the processor 110, processing various data, and performing operations. The processor 110 may be implemented as, for example, a system on chip (SoC). According to an embodiment, the processor 110 may further include a graphics processing unit (GPU) and/or an image signal processor.

The processor 110 may also include at least part of the components shown in FIG. 1, e.g., the cellular module 121. The processor 110 is capable of loading commands or data received from at least one of other components (e.g., a non-volatile memory) on a volatile memory, and is capable of processing the loaded commands or data. The processor 110 is capable of storing various data in the non-volatile memory (e.g. memory 130). The communication module 120 may perform data communication with any other electronic device connected to the electronic device 100 through the network. According to an embodiment, the communication module 120 may include therein a cellular module 121, a Wi-Fi module 123, a BT module 125, a GNSS or GPS module 127, an NFC module 128, and a radio frequency (RF) module 129. The cellular module 121 is capable of providing voice calls, video calls, short message service (SMS), Internet service, etc., through a communication network, for example. According to an embodiment, the cellular module 121 is capable of identifying and authenticating the electronic device 100 in a communication network by using the SIM 124 (e.g., a SIM card). According to an embodiment, the cellular module 121 is capable of performing at least part of the functions provided by the processor 110. According to an embodiment, the cellular module 121 is may include a communication processor (CP). The processor 110 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The Wi-Fi module 123, the BT module 125, the GNSS module 127, and the NFC module 128 may each include a processor for processing data transmitted or received through the corresponding module.

According to various embodiments, at least part of the cellular module 121, Wi-Fi module 123, BT module 125, GNSS module 127, and NFC module 128 (e.g., two or more modules) may be included in one integrated chip (IC) or one IC package. The RF module 129 is capable of transmission/reception of communication signals, e.g., RF signals. The RF module 129 may include a transceiver, a power amp module (PAM), a frequency filter, a low noise amplifier (LNA), an antenna, etc. According to an embodiment, at least one of the cellular module 121, the Wi-Fi module 123, the BT module 125, the GNSS module 127, and the NFC module 128 is capable of transmission/reception of RF signals through a separate RF module. The SIM module 124 may include a SIM card or an embedded SIM. The SIM module 124 may also contain unique identification information, e.g., integrated circuit card identifier (ICCID), or subscriber information, e.g., international mobile subscriber identity (IMSI).

As illustrated in FIG. 1, memory 130 may include a built-in or internal memory 132 and/or an external memory 134. The built-in or internal memory 132 may be at least one of the following: a volatile memory, e.g., a dynamic random access memory (DRAM), a static RAM (SRAM), a synchronous dynamic RAM (SDRAM), etc.; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, etc.), a hard drive, a solid state drive (SSD), etc.

The sensor module 140 is capable of measuring/detecting various physical attributes or operation states of the electronic device 100, and is capable of converting the measured or detected information into electronic signals. The sensor module 140 may be at least one of the following: a gesture sensor 140A, a gyro sensor 140B, an atmospheric pressure or barometer sensor 140C, a magnetic sensor 140D, an acceleration sensor 140E, a grip sensor 140F, a proximity sensor 140G, a color or RGB sensor 140H (e.g., a red, green and blue (RGB) sensor), a biometric sensor 140I, a temperature/humidity sensor 140J, an illuminance sensor 140K, and an ultraviolet (UV) sensor 140M.

Additionally or alternatively, the sensor module 140 may further include on or more of the following sensors (not shown): an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor. The sensor module 140 may further include a control circuit for controlling one or more sensors included therein.

In various embodiments of the present disclosure, the electronic device 100 may include a processor, configured as part of the processor 110 or a separate component, for controlling the sensor module 140. In this case, while the processor 110 is operating in a sleep mode, the other processor is capable of controlling the sensor module 140. The input device 150 may include a touch panel 152, a (digital) pen sensor (digital pen or stylus) 154, a key 156, or an ultrasonic input unit or device 158. The touch panel 152 may be implemented with at least one of the following: a capacitive touch system, a resistive touch system, an infrared touch system, and an ultrasonic touch system. The touch panel 152 may further include a control circuit. The touch panel 152 may also further include a tactile layer to provide a tactile response or feedback to the user. The (digital) pen sensor 154 may be implemented with a part of the touch panel or with a separate recognition sheet. The key 156 may include a physical button, an optical key, or a keypad. The ultrasonic input unit 158 is capable of detecting ultrasonic waves, which may be emitted through the microphone 188, and is capable of identifying signals corresponding to the detected ultrasonic waves.

The display 160 may include a panel 162, a hologram unit or device 164, or a projector 166. The panel 162 may be implemented to be flexible, transparent, or wearable. The panel 162 may also be incorporated into one module together with the touch panel 152. The hologram unit 164 is capable of showing a stereoscopic image in the air by using light interference. The projector 166 is capable of displaying an image by projecting light onto a screen. The screen may be located inside or outside of the electronic device 100. According to an embodiment, the display 160 may further include a control circuit for controlling the panel 162, the hologram unit 164, or the projector 166.

The interface 170 is capable of including an HDMI 172, a USB 174, an optical interface 176, or a D-subminiature (D-sub) 178. The interface 170 may be included in the communication interface 107 shown in FIG. 1. Additionally or alternatively, the interface 170 may include a mobile high-definition link (MHL) interface, an SD card/MMC interface, or an infrared data association (IrDA) standard interface.

The audio module 180, as illustrated in FIG. 1, is capable of providing bidirectional conversion between sounds and electronic signals. At least part of the components in the audio module 180 may be included in the input/output interface 145 shown in FIG. 1. The audio module 180 is also capable of processing sound information input or output through the speaker 182, the receiver 184, the earphones 186, and the microphone 188.

The camera module 191 refers to a device capable of taking both still and moving images. According to an embodiment, the camera module 191 is capable of including one or more image sensors (e.g., a front image sensor or a rear image sensor), a lens, an image signal processor (ISP), a flash (e.g., an LED or xenon lamp), etc.

The power management module 195 is capable of managing power of the electronic device 100. According to an embodiment, the power management module 195 may include a power management IC (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 196. The battery 196 may be a rechargeable battery.

The indicator 197 is capable of displaying various specific statuses of the electronic device 100 or a part thereof (e.g., the processor 110), e.g., a boot-up status, a message status, a charging status, etc. The motor 198 is capable of converting an electrical signal into mechanical vibrations, such as vibration effect or a haptic effect. Although not shown, the electronic device 100 may further include a processing unit (e.g., GPU) for supporting various mobile TV protocols. The processing unit for supporting mobile TV is capable of processing media data pursuant to various standards, e.g., digital multimedia broadcasting (DMB), digital video broadcasting (DVB), or MediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as before the coupling.

Figure 2A:
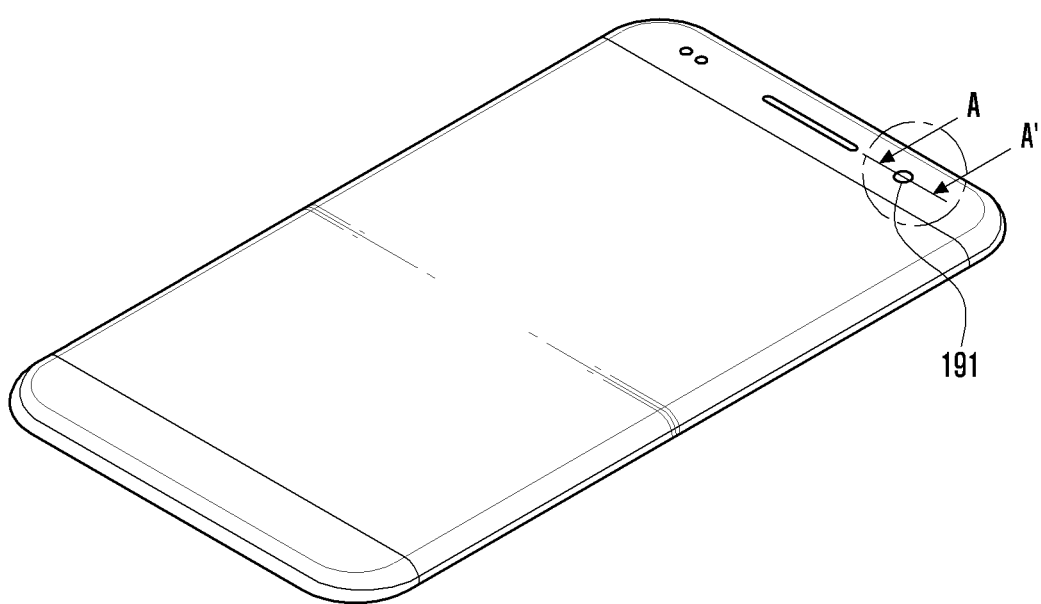
FIG. 2A is a perspective view illustrating an electronic device according to an embodiment of the present disclosure.
Figure 2B:
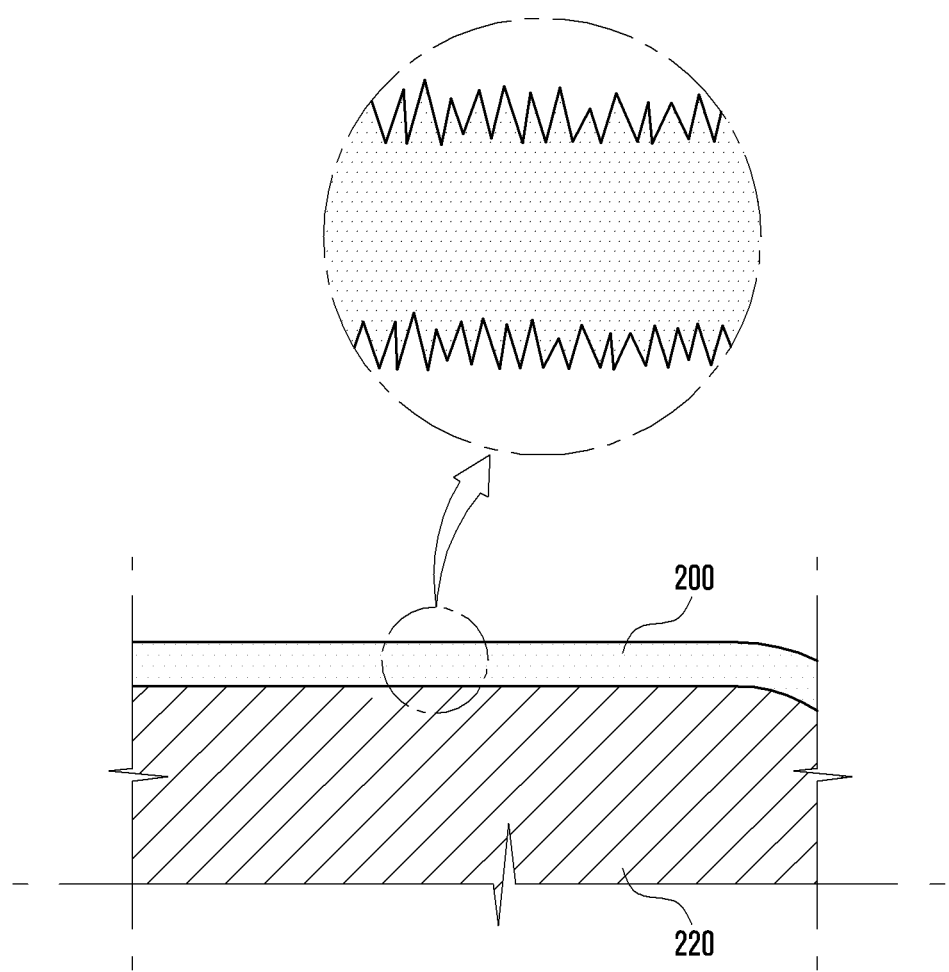
FIG. 2B is a cross-sectional view taken along the line A-A' of FIG. 2A.

FIG. 2A is a perspective view illustrating an electronic device according to an embodiment of the present disclosure, and FIG. 2B is a cross-sectional view taken along the line A-A' of FIG. 2A.

The electronic device (e.g. the electronic device 100 in FIG. 1) according to an embodiment may include a cover glass 200 that covers an internal element 220 (e.g., the camera 191) of the electronic device 100 or the display.

As shown in FIG. 2A, the electronic device 100 according to an embodiment may have a curved surface formed on at least a portion thereof (e.g., a lateral side of the electronic device). The cover glass 200 may be processed such that at least a portion thereof has a curved surface corresponding to the curved surface of the electronic device 100. For example, the electronic device 100 may include a curved display, and at least a portion of the cover glass 200 corresponding to the curved portion of the display may also be curved.

According to an embodiment, when the cover glass 200 is processed to have a curved surface, an uneven portion may be formed on the surface of the cover glass 200 as shown in FIG. 2B.

For example, when the cover glass 200 is processed to have a curved surface, the optical flatness may be uneven, as shown in the enlarged view in FIG. 2B. Such deviation from ideal flatness may cause degradation in the resolution of the camera 191 covered by the cover glass 200.

Figure 3:
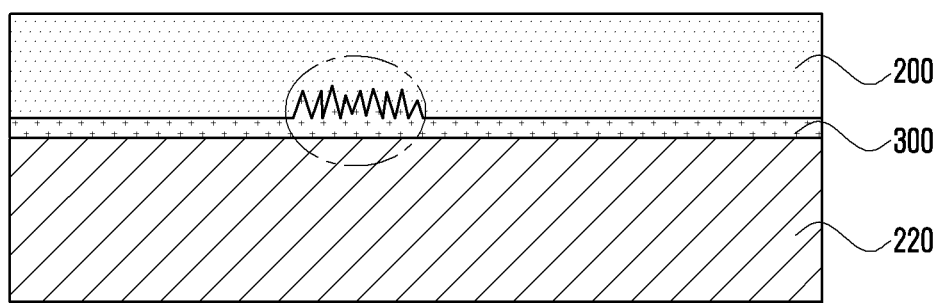
FIG. 3 is a cross-sectional view illustrating an electronic device including a cover glass formed with a planarization material on one surface thereof according to an embodiment of the present disclosure.

FIG. 3 is a cross-sectional view illustrating a cover glass 200 formed with a planarization material 300 on one surface thereof according to an embodiment of the present disclosure.

As shown in FIG. 3, when the cover glass 200 is processed to have a curved surface in at least a portion thereof, the cover glass 200 may have an uneven portion on one surface thereof. Unfortunately, such an uneven portion of the cover glass 200 may degrade the optical flatness characteristics of the cover glass 200.

According to an embodiment, the planarization material 300 is formed on one surface of the cover glass 200. This surface of the cover glass 200 on which the planarization material 300 is formed faces the internal element 220 of the electronic device 100. The planarization material 300 evenly covers the uneven portion of the cover glass 200, thus improving the optical flatness characteristics of the cover glass 200.

Figure 4:
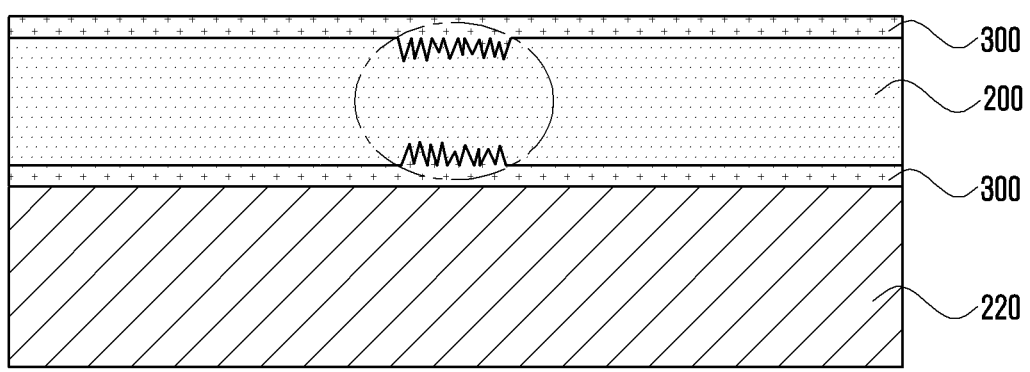
FIG. 4 is a cross-sectional view illustrating an electronic device including a cover glass formed with a planarization material on both surfaces thereof according to an embodiment of the present disclosure.

FIG. 4 is a cross-sectional view illustrating a cover glass 200 formed with a planarization material 300 on both surfaces thereof according to an embodiment of the present disclosure.

As shown in FIG. 4, when the cover glass 200 is processed to have a curved surface in at least a portion thereof, the cover glass 200 may have an uneven portion on at least a surface thereof. In FIG. 4, both surfaces of the cover glass 200 may be unacceptably uneven.

According to an embodiment, in order to evenly cover the uneven portions of the cover glass 200, the planarization material 300 is formed on both surfaces, i.e., first and second surfaces, of the cover glass 200. The first surface of the cover glass 200 faces the internal element 220 of the electronic device 100, and the second surface of the cover glass 200 is opposite the first surface.

The planarization material 300 formed on the cover glass 200 improves the optical flatness characteristics of the cover glass 200.

For example, the optical flatness characteristics of the cover glass 200 may be checked by measuring the peak-to-valley values.

When the cover glass 200 is processed using the planarization material 300, the optical flatness characteristics of the cover glass 200 is greatly improved as shown in Table 1.

TABLE 1

|  | Sample 1 | Sample 2 | Sample 3 |
|---|---|---|---|
| Peak-to-valley before processing | 0.468 wavelength | 0.867 wavelength | 0.341 wavelength |
| Peak-to-valley after processing | 0.102 wavelength | 0.096 wavelength | 0.139 wavelength |
| Improvement | 78.2% | 88.9% | 59.2% |

The peak-to-valley value is a value that indicates the degree of distortion of a wave front when light passes through an optical system. A wavelength value of 1 denotes about 633 nm. If the measured value of peak-to-valley is a wavelength of 0.3 or less, this may be interpreted that there is almost no optical error. For example, if the peak-to-valley value of the cover glass 200 is a wavelength of 0.25 or less, this may be interpreted that the optical characteristics of the camera covered by the cover glass 200 are not degraded by the cover glass 200.

When the cover glass 200 is processed using the planarization material 300 according to various embodiments of the present disclosure, the peak-to-valley value after processing is within a wavelength range of 0.5 or less. Also, as compared to pre-processing, using the planarization material 300 may improve optical characteristics by 50%.

Figure 5:
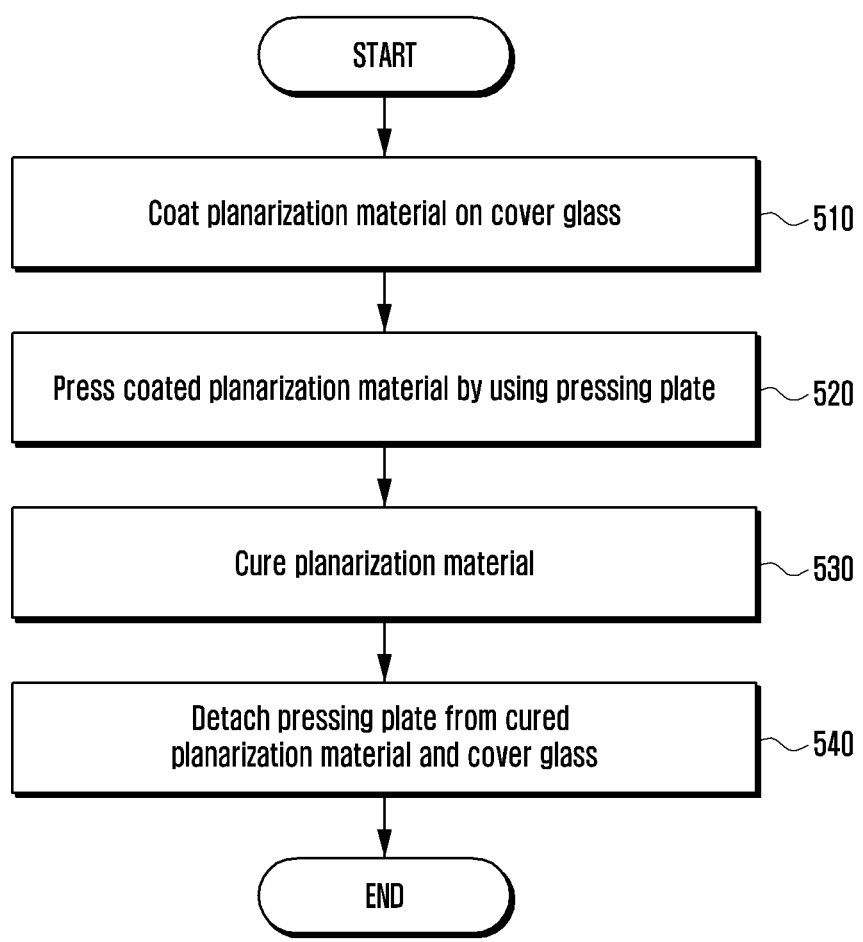
FIG. 5 is a flow diagram illustrating a method for processing a cover glass according to an embodiment of the present disclosure.

FIG. 5 is a flow diagram illustrating a method for processing a cover glass 200 according to an embodiment of the present disclosure.

According to an embodiment, the cover glass 200 that covers the internal element 220 of the electronic device 100 may be processed with the planarization material 300 to improve optical flatness.

According to an embodiment, the processing method for the cover glass 200 may include operation 510, where the planarization material 300 is coated on the cover glass 200.

For example, the planarization material 300 may be coated on one surface of the cover glass 200. For example, the region on which the planarization material 300 is coated may correspond to the position of the camera 191 when the cover glass 200 is mounted on the electronic device 100.

For example, the planarization material 300 may be a material having substantially transparent characteristics when cured, such that it does not impair the outer appearance or deteriorate the performance of the camera.

The refractive index of the planarization material 300 after being cured may be substantially similar to that of the cover glass 200. For example, the refractive index of the planarization material 300 may be within a range of 0.2 or less from the refractive index of the cover glass 200 so as not to distort the characteristics of the light passing through the cover glass 200.

According to an embodiment, during operation 510, the planarization material 300 may be a liquid that is coated on the cover glass 200.

In this case, for example, the planarization material 300 may be a material that can be cured by heat or ultraviolet rays under specified conditions.

According to an embodiment, the processing method for the cover glass 200 may include operation 520, where the coated planarization material 300 is pressed toward the cover glass 200.

For example, the pressing operation may be performed using a pressing plate. For example, the pressing plate may be formed with a material having good optical flatness characteristics. For example, the optical flatness characteristics of the pressing plate may have a peak-to-valley value indicating a wavelength of 0.3 or less (e.g., wavelength of 0.25).

According to an embodiment, the pressing plate may be made of metal or glass.

According to an embodiment, the processing method for the cover glass 200 may include operation 530, where the planarization material 300 is cured while the pressing plate presses the planarization material 300 toward the cover glass 200.

For example, the planarization material 300 may be cured by heat or ultraviolet rays under specified conditions.

According to an embodiment, the processing method for the cover glass 200 may include operation 540, where the pressing plate is detached from the planarization material 300 and the cover glass 200 after the planarization material 300 is cured.

The pressing plate may be formed with a material having good release characteristics so as to be easily separated from the cured planarization material 300 and the cover glass 200.

Figure 6:
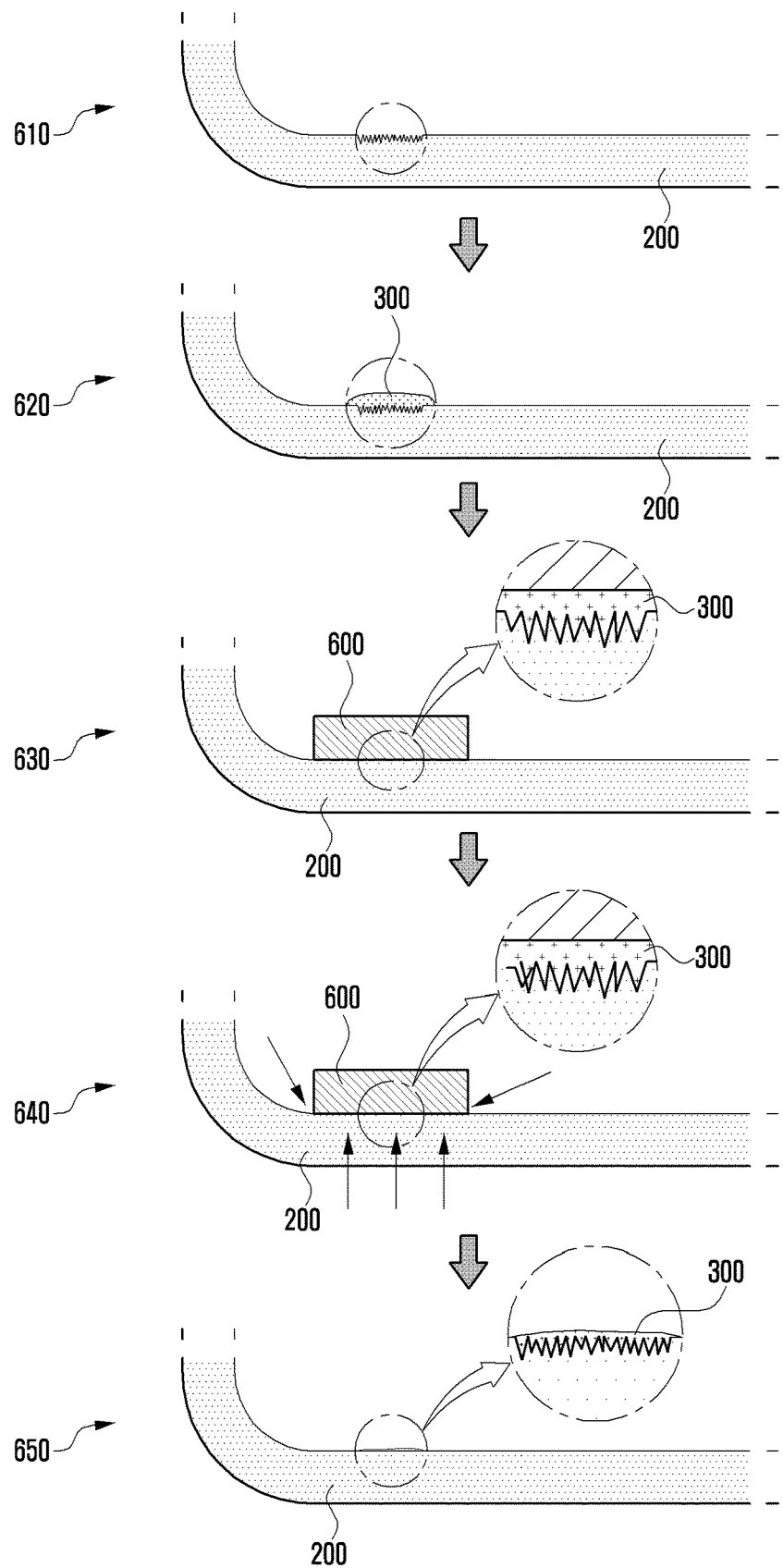
FIG. 6 are schematic views illustrating operations of processing a cover glass according to an embodiment of the present disclosure.

FIG. 6 are schematic views illustrating operations of processing a cover glass 200 according to an embodiment of the present disclosure.

According to an embodiment, when the cover glass 200 is mounted on the electronic device 100, the operations of processing the cover glass 200 may be performed on first and/or second surfaces of the cover glass 200. The first surface of the cover glass 200 faces the internal element 220 of the electronic device 100, and the second surface of the cover glass 200 faces in an opposite direction as the first surface.

As one example, the operations of processing the cover glass 200 using the planarization material 300 may be performed only on the first surface of the cover glass 200. In this case, the second surface of the cover glass 200 may be processed using a polishing technique to remove an uneven portion from the second surface.

As another example, the operations of processing the cover glass 200 using the planarization material 300 may be performed on both the first and second surfaces.

Referring to FIG. 6, as indicated by reference numeral 610, the cover glass 200 may have an uneven portion on a surface thereof when the cover glass has a curved surface.

As indicated by reference numeral 620, the liquid planarization material 300 may be coated on at least a portion of the first surface of the cover glass 200 to cover the uneven portion of the cover glass 200. For example, the region on which the planarization material 300 is coated may correspond to the camera 191 when the cover glass 200 is mounted on the electronic device 100.

Next, as indicated by reference numeral 630, a pressing plate 600 may press the coated liquid planarization material 300 toward the cover glass 200. The pressing plate 600 may be formed with a material having good optical flatness characteristics. For example, the optical flatness characteristics of the pressing plate 600 may have a peak-to-valley value indicating a wavelength of 0.3 or less.

Next, as indicated by reference numeral 640, the planarization material 300 may be cured by applying heat or ultraviolet rays to the liquid planarization material 300 pressed by the pressing plate 600. For example, as shown, heat or ultraviolet rays may be applied uniformly in many directions such that the planarization material 300 is evenly cured.

After the planarization material 300 is cured, the pressing plate 600 may be detached from the cured planarization material 300 and the cover glass 200 as indicated by reference numeral 650. For example, the pressing plate 600 may be formed with a material having good release characteristics so as to be easily separated from the cured planarization material 300 and the cover glass 200.

As fully described above, by performing the processing operations using the planarization material 300 on at least a part of the cover glass 200, it is possible to improve the optical flatness of the cover glass without forming a hole in the portion of the cover glass corresponding to the camera. It is therefore possible to provide to maintain the high performance of the camera in the electronic device 100.

In addition, according to an embodiment, the planarization material 300 formed on the cover glass 200 may have a refractive index which differs within a range of 0.2 or less from the refractive index of the cover glass 200.

In addition, according to an embodiment, the cover glass 200 processed using the planarization material 300 may have a peak-to-valley value which is within a wavelength range of 0.5 or less.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be an integrated component or a part thereof for performing one or more functions. The "module" may be implemented mechanically or electronically. For example, the "module" according to an embodiment of the present disclosure may include at least one of an application-specific IC (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc ROM (CD-ROM) and DVD; magneto-optical media, such as floptical disks; and hardware devices that are specially configured to store and perform program instructions (e.g., programming modules), such as ROM, RAM, flash memory, etc. Examples of program instructions include machine code instructions created in assembly languages by a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more additional components, or one or more of the components described above may be removed. The operations performed by modules, programming modules, or the other components, according to the present disclosure, may be executed in serial, parallel, repetitive or heuristic fashion. Part of the operations can be executed in any other order, skipped, or executed with additional operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a camera;
   a cover glass covering the camera and having a first surface facing the camera and a second surface facing a direction opposite the first surface, wherein at least one portion of the cover glass is curved to cause a peak-to-valley value of the at least one portion of the cover glass to be within a wavelength range of 0.3 or more; and
   a substantially transparent planarization material coated on at least one of the first surface and the second surface of the cover glass such that the peak-to-valley value of the at least one portion of the cover glass, when coated with the planarization material, is within a wavelength range of less than 0.3.

2. The electronic device of claim 1, wherein the planarization material is coated on a region of the cover glass corresponding to the camera.

3. The electronic device of claim 1, further comprising:
   a curved display,
   wherein the at least one portion of the cover glass is curved to correspond to the curved display.

4. The electronic device of claim 1, wherein a refractive index of the planarization material is within a range of 0.2 from a refractive index of the cover glass.

5. The electronic device of claim 1, wherein the planarization material is cured by heat or ultraviolet rays.

6. The electronic device of claim 1, wherein the first surface of the cover glass is processed using the planarization material, and the second surface of the cover glass is processed using a polishing technique.

7. The electronic device of claim 1, wherein the planarization material is coated directly on at least one of the first surface and the second surface of the cover glass without intervening components.

8. The electronic device of claim 1, wherein a refractive index of the planarization material is within a range of 0.2 or less from a refractive index of the cover glass.

9. An electronic device comprising:
   a camera disposed in an inner space of the electronic device;
   a cover glass covering the camera and having a first surface facing the camera and a second surface facing a direction opposite the first surface, wherein the cover glass defines a portion of an exterior of the electronic device; and
   a substantially transparent planarization material coated on at least one of the first surface and the second surface of the cover glass,
   wherein the substantially transparent planarization material is coated on a portion of the cover glass corresponding to the camera in the at least one of the first surface and the second surface of the cover glass.

* * * * *